(12) United States Patent
Liu

(10) Patent No.: US 11,379,138 B2
(45) Date of Patent: Jul. 5, 2022

(54) METHOD, DEVICE, AND COMPUTER PROGRAM PRODUCT FOR MANAGING ACCESS REQUEST IN STORAGE SYSTEM

(71) Applicant: EMC IP Holding Company LLC, Hopkinton, MA (US)

(72) Inventor: Bing Liu, Tianjin (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 159 days.

(21) Appl. No.: 16/863,552

(22) Filed: Apr. 30, 2020

(65) Prior Publication Data
US 2021/0157499 A1      May 27, 2021

(30) Foreign Application Priority Data
Nov. 26, 2019   (CN) .......................... 201911176961.7

(51) Int. Cl.
*G06F 12/02*      (2006.01)
*G06F 3/06*      (2006.01)

(52) U.S. Cl.
CPC .......... *G06F 3/0644* (2013.01); *G06F 3/0608* (2013.01); *G06F 3/0611* (2013.01); *G06F 3/0652* (2013.01); *G06F 3/0653* (2013.01); *G06F 3/0689* (2013.01)

(58) Field of Classification Search
CPC .... G06F 3/0644; G06F 3/0608; G06F 3/0611; G06F 3/0652; G06F 3/0653; G06F 3/0689; G06F 3/061; G06F 3/064; G06F 3/0659; G06F 12/0246; G06F 12/0253
See application file for complete search history.

(56) References Cited

U.S. PATENT DOCUMENTS

| | | | |
|---|---|---|---|
| 9,658,923 B2 * | 5/2017 | Gao | .................... G06F 11/1072 |
| 9,940,198 B2 * | 4/2018 | Gao | ...................... G06F 11/108 |
| 10,078,583 B1 * | 9/2018 | Wallace | ................ G06F 3/0608 |
| 10,235,285 B1 * | 3/2019 | Wallace | ................ G06F 3/0608 |
| 10,346,297 B1 * | 7/2019 | Wallace | ................ G06F 3/0641 |
| 2016/0092309 A1 * | 3/2016 | Gao | .................... G06F 11/2058 |
| | | | 714/6.23 |
| 2017/0185484 A1 * | 6/2017 | Gao | .................... G06F 11/2058 |

* cited by examiner

*Primary Examiner* — Christopher D Birkhimer
(74) *Attorney, Agent, or Firm* — Chamberlain, Hrdlicka, White, Williams & Aughtry

(57) ABSTRACT

The present disclosure relates to a method, device and program product for managing an access request in a storage system. In the method, based on an access request to the storage system, an address range of a data object involved in the access request is obtained. An access type of the access request is identified in accordance with determining that a garbage collection operation is performed on a data extent within the address range. The access request is responded to based on the access type by using a data extent within an address range in the storage system on which no garbage collection operation is performed.

16 Claims, 9 Drawing Sheets

METHOD, DEVICE, AND COMPUTER PROGRAM PRODUCT FOR MANAGING ACCESS REQUEST IN STORAGE SYSTEM

CROSS-REFERENCE TO RELATED APPLICATIONS

This application claims priority to Chinese Application No. 201911176961.7 filed on Nov. 26, 2019. Chinese Application No. 201911176961.7 is hereby incorporated by reference in its entirety.

FIELD

Various implementations of the present disclosure relate to the management of a storage system, and more specifically, to a method, device and computer program product for managing an access request in a storage system.

BACKGROUND

With the development of data storage technology, various data storage devices now provide users with increasingly large data storage capability, and also their data access speed has been greatly improved. As users continuously write and delete data from a storage system, fragments will arise in storage space of the storage system. Here the fragments mean that free storage space in the storage system is not contiguous, but free storage space and allocated storage space are too small and interlaced. At this point, garbage collection needs to be performed on the storage system, so as to ensure that free extents and allocated extents in the storage system are distributed in a contiguous way as far as possible. Therefore, a focus of research has become a more effective way for managing garbage collection and subsequent access request operations in the storage system.

SUMMARY

Therefore, it is desirable to develop and implement a technical solution for managing a storage system more effectively. It is desired that the technical solution be compatible with an existing application system to more effectively manage tasks in a storage system by reconstructing configurations of the existing storage system.

According to a first aspect of the present disclosure, a method is provided for managing an access request in a storage system. In the method, based on an access request to the storage system, an address range of a data object involved in the access request is obtained. Whether a garbage collection operation is performed on a data extent within the address range or not is determined based on an association relationship between a group of address ranges and a group of operations being performed on a group of data extents within the group of address ranges. An access type of the access request is identified in accordance with determining that the garbage collection operation is performed on a data extent within the address range. The access request is responded to based on the access type by using a data extent within an address range in the storage system on which no garbage collection operation is performed.

According to a second aspect of the present disclosure, an electronic device is provided, and the electronic device includes: at least one processor; and a memory coupled to the at least one processor, the memory having instructions stored thereon, the instructions, when executed by the at least one processor, causing the device to perform acts. The acts include: obtaining, based on an access request to the storage system, an address range of a data object involved in the access request; determining whether a garbage collection operation is performed on a data extent within the address range or not, based on an association relationship between a group of address ranges and a group of operations performed on a group of data extents within the group of address ranges; identifying an access type of the access request in accordance with determining that the garbage collection operation is performed on a data extent within the address range; and responding to the access request based on the access type by using a data extent within an address range in the storage system on which no garbage collection operation is performed.

According to a third aspect of the present disclosure, a computer program product is provided. The computer program product is tangibly stored on a non-transitory computer-readable medium and includes machine-executable instructions which are used to implement a method according to the first aspect of the present disclosure.

BRIEF DESCRIPTION OF THE DRAWINGS

Through the more detailed description in the accompanying drawings, features, advantages and other aspects of the implementations, the present disclosure will become more apparent. Several implementations of the present disclosure are illustrated schematically and are not intended to limit the present invention. In the drawings.

DETAILED DESCRIPTION OF IMPLEMENTATIONS

Figure 1A:
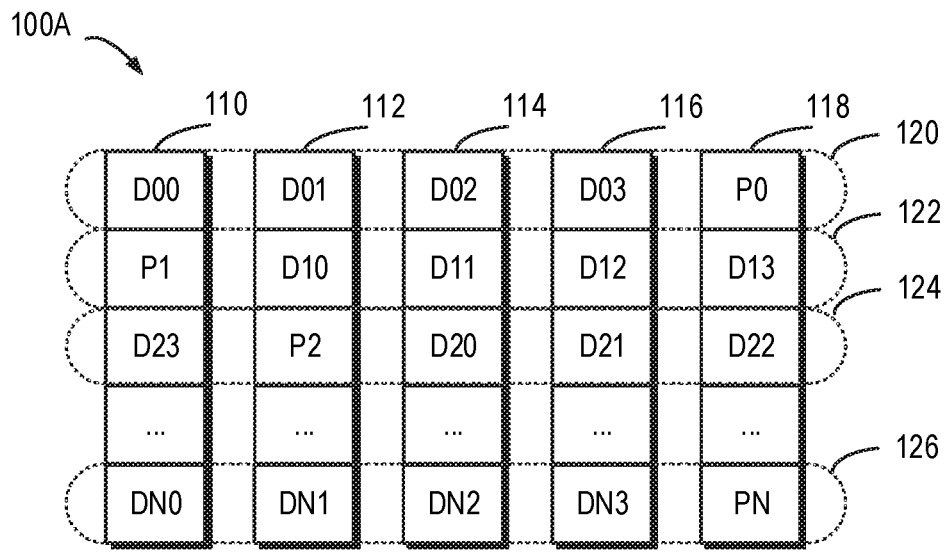
FIGS. 1A and 1B show block diagrams of a storage system in which a method of the present disclosure may be implemented, respectively.

The preferred implementations of the present disclosure will be described in more detail with reference to the drawings. Although the drawings illustrate the preferred implementations of the present disclosure, it should be appreciated that the present disclosure can be implemented in various ways and should not be limited to the implementations explained herein. On the contrary, the implementations are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example implementation" and "one implementation" are to be read as "at least one example implementation." The term "a further implementation" is to be read as "at least a further implementation." The terms "first", "second" and so on can refer to same or different objects. The following text also can include other explicit and implicit definitions.

It will be understood during operations of the storage system, garbage collection operations often need to be performed in the background so as to ensure the efficiency of the storage system and the continuity of allocable storage space. In the garbage collection operation, data extents need to be migrated, e.g., dispersedly allocated data extents may be migrated to contiguous storage space. In this way, it may be ensured that allocated extents are distributed continuously and also free extents available for allocation may be distributed continuously. Usually garbage collection operations are performed in the background of the storage system, and will cause latency in access request operations on data extents in the storage system.

Technical solutions for improving the performance of garbage collection have been provided. In one technical solution, the vendor of a storage device has proposed to improve the performance of garbage collection by optimizing firmware. However, this technical solution is implemented inside the storage device; after the storage device has been deployed in the storage system, the administrator of the storage system cannot modify the internal configuration of the storage device.

In another technical solution, the garbage collection has been proposed to be managed at the storage system-level. For example, a situation of performing large-scale garbage collection after the storage system has excessive garbage may be avoided, but small-scale garbage collection may be performed in the storage system at any time. This technical solution can prevent large-scale garbage collection from causing access request latency for a long period. Nevertheless, if a user happens to access data in the storage system during small-scale garbage collection, he/she will also be faced with access request latency. At this point, it has become a focus of research for processing access to data extents in the storage system so as to reduce latency caused by the garbage collection.

First, description is presented below to an application environment of the present disclosure. In the context of the present disclosure, the storage system may be a RAID-based storage system. The RAID-based storage system may combine a plurality of storage devices into an array of disks. By providing redundant storage devices, the reliability of an entire disk group significantly exceeds that of a single storage device. RAID may offer various advantages over a single storage device, for example, enhancing data integrity, enhancing fault tolerance, increasing throughput or capacity, etc. There exist a number of RAID standards, such as RAID-1, RAID-2, RAID-3, RAID-4, RAID-5, RAID-6, RAID-10, RAID-50, etc.

FIG. 1A schematically illustrates a block diagram of a storage system 100A in which a method of the present disclosure may be implemented. In the storage system shown in FIG. 1A, working principles of RAID are illustrated by taking a RAID-5 (4D+1P, where 4D represents that 4 storage devices are included in the storage system for storing data, and 1P represents that 1 storage device is included in the storage system for storing parity) array that consists of five independent storage devices (110, 112, 114, 116 and 118) as an example. It should be noted that although five storage devices are schematically shown in FIG. 1A, in other implementations more or less storage devices may be included according to different levels of RAID. Moreover, although FIG. 1A illustrates stripes 120, 122, 124, . . . , 126, in other examples the RAID system may further include a different number of stripes.

In RAID, a stripe may cross a plurality of physical storage devices (for example, the stripe 120 crosses the storage devices 110, 112, 114, 116 and 118). The stripe may be simply construed as a storage area among a plurality of storage devices which satisfies a given address range. Data stored in the stripe 120 includes a plurality of parts: a data block D00 stored in the storage device 110, a data block D01 stored in the storage device 112, a data block D02 stored in the storage device 114, a data block D03 stored in the storage device 116, and a data block P0 stored in the storage device 118. In this example, the data blocks D00, D01, D02 and D03 are stored data, and the data block P0 is a P parity of the stored data.

The mode of storing data in other stripes 122 and 124 is similar to that in the stripe 120, the difference being that the parity about other data blocks may be stored in storage devices other than the storage device 118. In this way, when one of the plurality of storage devices 110, 112, 114, 116 and 118 fails, data in the failed device may be recovered from other normal storage devices.

Figure 1B:
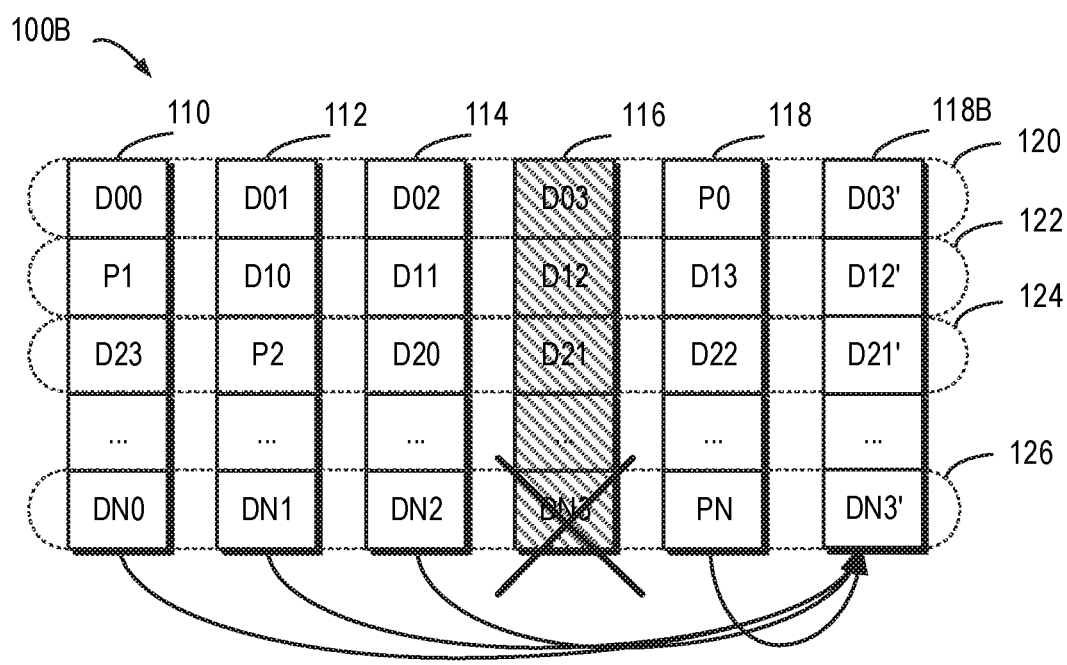

FIG. 1B schematically illustrates a block diagram 100B of a rebuilding process of the storage system 100A. As shown in FIG. 1B, when one storage device (e.g., the shaded storage device 116) fails, data may be recovered from the other storage devices 110, 112, 114 and 118 that operate normally. At this point, a new backup storage device 118B may be added to RAID to replace the storage device 118. In this way, recovered data may be written to 118B, and system rebuilding may be realized.

Note that while a RAID-5 storage system comprising 5 storage devices (among which 4 storage devices are used for storing data and 1 storage device is used for storing parity) has been described with reference to FIGS. 1A and 1B, according to the definition of other RAID levels, there may further exist a storage system comprising a different number of storage devices. On the basis of the definition of RAID-6, for example, two storage devices may be used to store parity P and Q, respectively. In another example, according to the definition of triple-parity RAID, three storage devices may be used to store parity P, Q and R, respectively.

Figure 2:
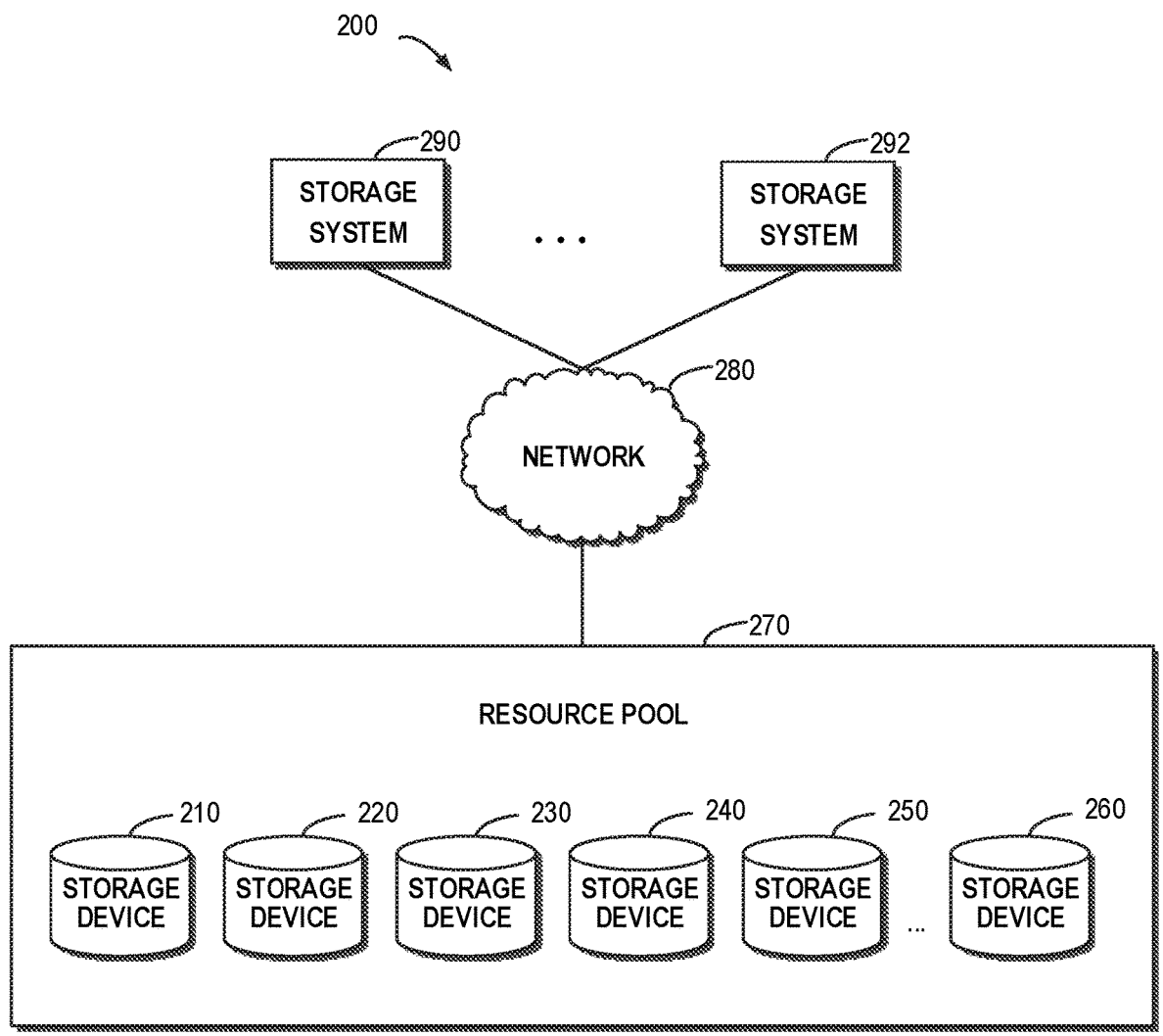
FIG. 2 schematically shows a block diagram of an example environment in which a method of the present disclosure may be implemented.

With the development of distributed storage technologies, the various storage devices 110, 112, 114, 116 and 118 in the storage system shown in FIGS. 1A and 1B may no longer be limited to physical storage devices but may be virtual storage devices. For example, respective extents on the storage device 110 may come from different physical storage devices (hereinafter referred to as storage devices for short) in the resource pool. FIG. 2 schematically shows a block diagram of an example environment in which the method of the present disclosure may be implemented. As depicted, a storage resource pool 270 may include a plurality of physical storage devices 210, 220, 230, 240, 250, . . . , 260. At this point, storage space in the plurality of storage devices may be allocated to a plurality of user storage systems 290, . . . , 292. At this point, these user storage systems 290, . . . , 292 may access the storage space in the various storage devices in the storage resource pool 270 via a network 280.

Figure 3:
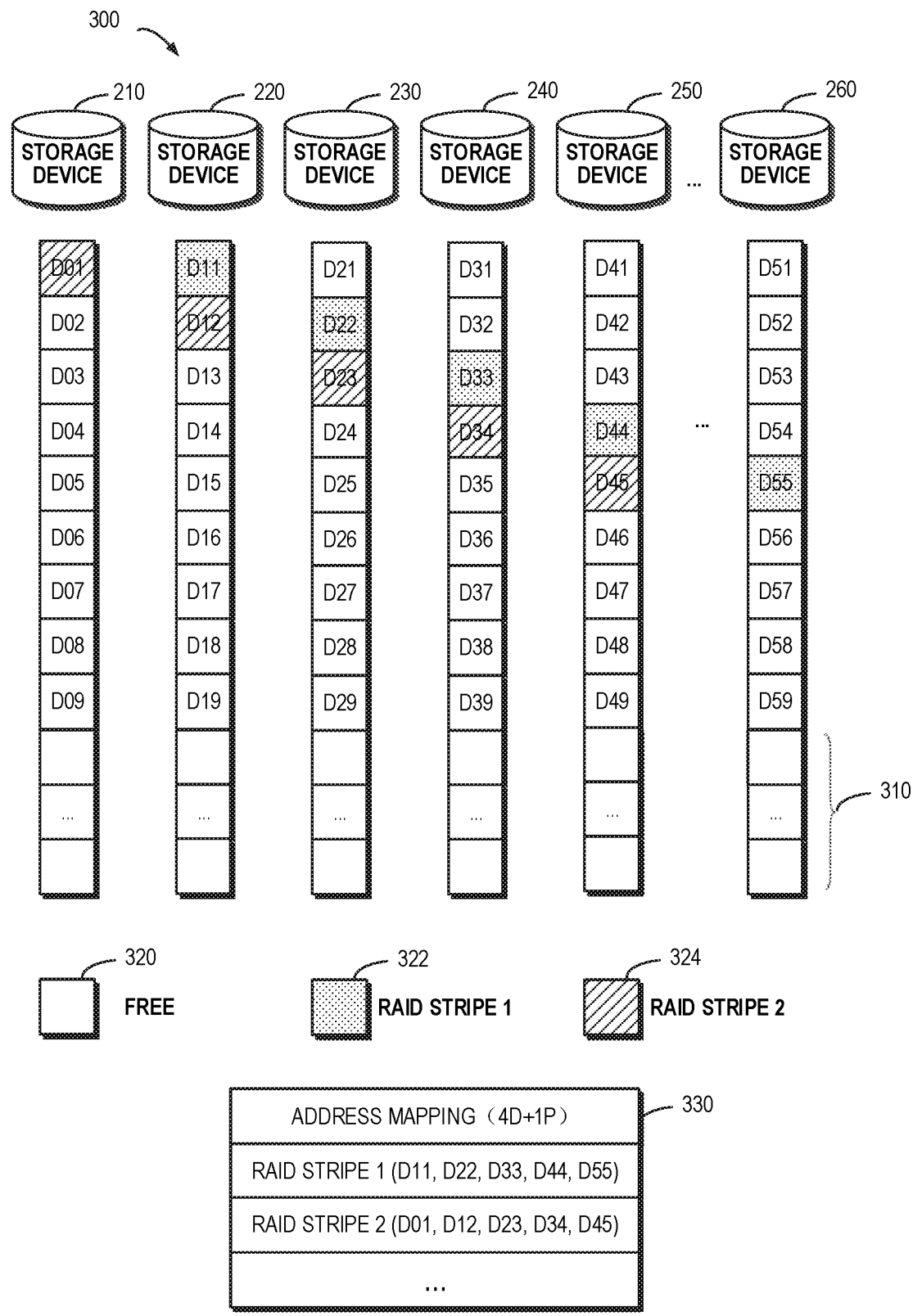
FIG. 3 schematically shows a diagram of a storage resource pool in FIG. 2.

FIG. 3 schematically shows a diagram of more information of the storage resource pool 270 shown in FIG. 2. The resource pool 270 may include a plurality of storage devices 210, 220, 230, 240, 250, . . . , and 260. Each storage device may include a plurality of extents, wherein a legend 320 represents a free extent, a legend 322 represents an extent for RAID stripe 1 of the storage system 110A in FIG. 1, and a legend 324 represents an extent for RAID stripe 2 of the storage system 110A in FIG. 1. At this point, extents D11, D22, D33 and D44 for RAID stripe 1 are used for storing data blocks of the stripe, respectively, and extent D55 is used for storing a parity of data. Extents D01, D12, D23 and D34 for RAID stripe 2 are used for storing data blocks of the stripe, respectively, and extent D45 is used for storing a parity of data.

As shown in FIG. 3, an address mapping 330 shows associations between a stripe and addresses of extents in the stripe. For example, RAID stripe 1 may include 5 extents, namely D11, D22, D33, D44 and D55, which reside on the storage devices 210, 220, 230, 240 and 250, respectively. As shown in FIG. 3, specifically, extent D11 is the first extent in the storage device 220, extent D22 is the second extent in the storage device 230. As shown in FIG. 3, there may exist a reserved spare portion 310 in each storage device, such that when a storage device in the resource pool fails, an extent in the spare portion 310 in each storage device may be selected to rebuild various extents in the failed storage device.

Those skilled in the art will appreciate that the 4D+1P RAID-5 storage system in FIG. 3 is provided as an example to illustrate how extents in various stripes are distributed over a plurality of storage systems in the resource pool. When RAID based on another level is employed, those skilled in the art may implement concrete details on the basis of the above described principles. For example, in the 6D+1P+1Q RAID-6 storage system, 8 extents in each stripe may be distributed over a plurality of storage devices so as to ensure a load balance between the plurality of storage devices.

Figure 4:
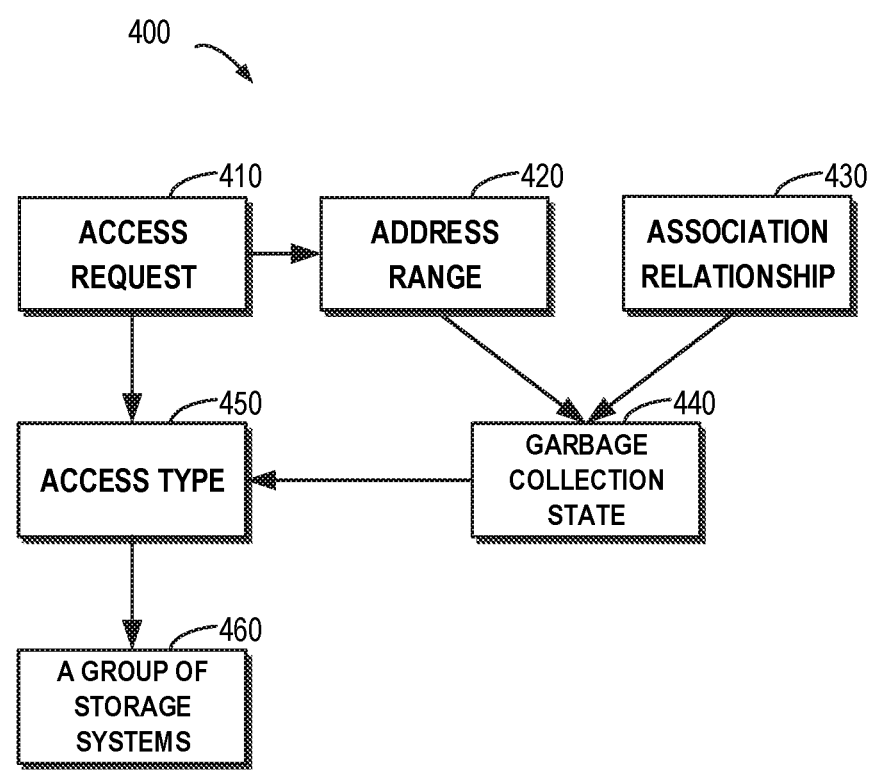
FIG. 4 schematically shows a block diagram of a process for managing an access request in a storage system according to example implementations of the present disclosure.

With reference to FIG. 4, description is presented below to a brief process for managing an access request. FIG. 4 schematically shows a block diagram 400 of a process for managing an access request in a storage system according to example implementations of the present disclosure. As depicted, an access request 410 may be obtained which may come from a user of the storage system 290. Alternatively and/or additionally, the access request may come from the storage system 290 itself, for example, may be an access request for maintaining the running of the storage system 290. An address range 420 of a data object that is desired to be accessed in the access request 410 may be determined.

The data object desired to be accessed may reside on any storage device in the storage system, and the storage device may be undergoing a garbage collection operation. According to example implementations of the present disclosure, an association relationship 430 is proposed, here the association relationship 430 describes an association between a group of address ranges and a group of operations being performed on a group of data extents within the group of address ranges. The association relationship 430 may be obtained based on machine learning technology, and a garbage collection state 440 may be obtained based on the association relationship 430, i.e., whether the address range 430 involved in the access request 430 is undergoing a garbage collection operation may be determined. Because garbage collection will significantly degrade the performance of data reads/writes, if it is determined that the address range 420 desired to be accessed is undergoing garbage collection, a group of storage devices 460 in the storage system which are not currently undergoing the garbage collection may be utilized to serve the access request 410.

With example implementations of the present disclosure, since the group of storage devices 460 which are not undergoing garbage collection have a higher access speed, serving the access request 410 by such storage devices may avoid latency caused by garbage collection and a response to the access request 410 may be provided at a higher speed. More details on how to manage the access request will be described with reference to FIG. 5 below.

Figure 5:
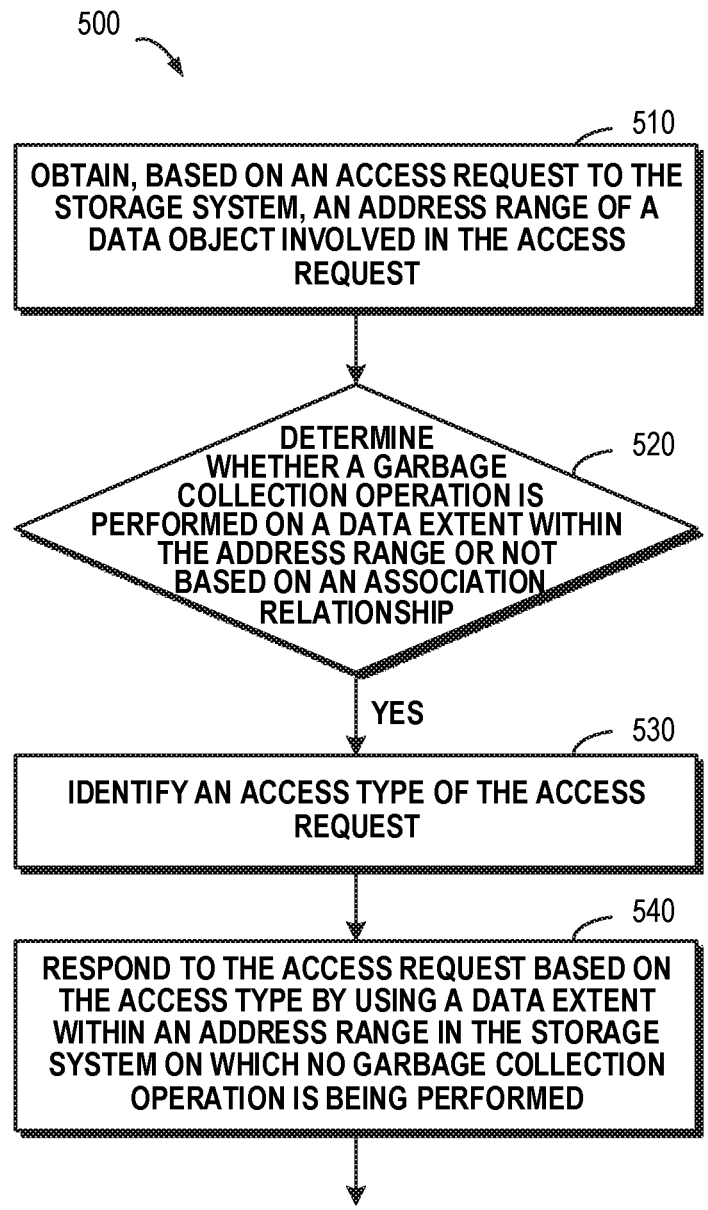
FIG. 5 schematically shows a flowchart of a method for managing an access request in a storage system according to example implementations of the present disclosure.

FIG. 5 schematically shows a flowchart of a method 500 for managing an access request in a storage system according to example implementations of the present disclosure. At block 510 of FIG. 5, based on the access request 410 to the storage system, the address range 420 of a data object involved in the access request 410 is obtained. In view of the format of the access request 410, the address range of the data object may be directly obtained from the access request 410. For example, the format of a read request is usually READ (obj, start add, len), at which point the address range of the data object is a range starting from start address with a length of len. The format of a write request is also similar, so the address range 420 involved in the write request may be obtained likewise.

Figure 6A:
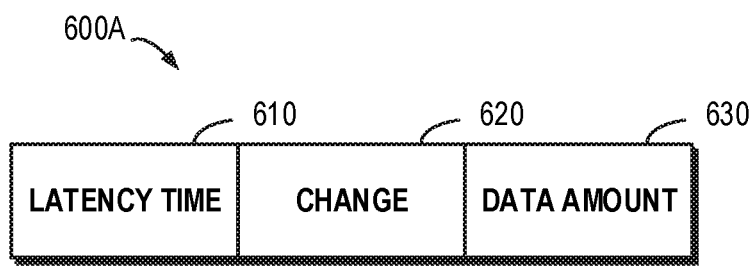
FIG. 6A schematically shows a block diagram of one example of a performance feature according to example implementations of the present disclosure.
Figure 6B:
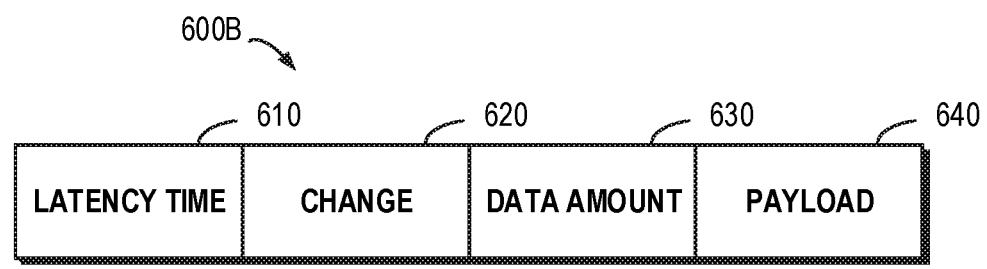
FIG. 6B schematically shows a block diagram of another example of a performance feature according to example implementations of the present disclosure.

At block 520, whether a garbage collection operation is currently being performed on a data extent within the address range may be determined based on the association relationship 430 between a group of address ranges and a group of operations being performed on a group of data extents within the group of address ranges. Here, the association relationship 430 may be obtained based on a machine learning method. With reference to FIGS. 6A and 6B, description is presented below to a performance feature used for obtaining the association relationship 430.

According to example implementations of the present disclosure, a group of performance features may be generated based on the group of address ranges, in order to generate an association relationship between a performance feature of the address range in the storage system and a garbage collection state. More details about the performance feature will be described with reference to FIGS. 6A and 6B. FIG. 6A schematically shows a block diagram of one example of a performance feature 600A according to example implementations of the present disclosure. As depicted, the performance feature may include at least one of latency time 610, a change 620 and a data stream amount.

According to example implementations of the present disclosure, a performance feature in the group of performance features may include various contents. As shown in FIG. 6A, the performance feature may include: the latency time 610, which represents the latency in accessing a data extent in the group of data extents. Suppose the access request is performed on the data extent, then a result will be obtained within a time period T1 when no garbage collection operation is performed on the data extent. If the same access request is performed on the data extent, then a result will be obtained within a time period T2 when garbage collection is performed on the data extent. At this point, $\Delta T=T2-T1$ stands for the latency time 610 of the access.

According to example implementations of the present disclosure, the performance feature 600A may include the change 620 of the latency time 610 within a predetermined time period. For example, the change 620 here may be calculated based on variation. In other words, the change may be determined based on an average of squares of differences between each sample value and an average of all sample values within the predetermined time period. For another example, the change may be determined based on the difference with the average.

According to example implementations of the present disclosure, the performance feature 600A may further include the data amount 630 for which the data extent is accessed. Here, the data amount 630 is a data amount to be accessed which is defined by the access request. Regarding a read request, the data amount may represent the size of a data object to be read from the storage system specified by the read request; regarding a write request, the data amount may represent the size of a data object to be written to the storage system specified by the write request.

It will be understood that the access request may be a write request and the write request may specify a data object to be written to the storage system, whereas a portion of the data object may have already been stored in the storage system. This case is especially common in a backup system. For example, the backup system may periodically back up a file system of a user, and only a few data objects in the file system are modified since the last backup. Therefore, the entire file system does not need to be rewritten to the storage system, but the write request may be performed in an incremental way. At this point, such a case may arise in which the data object specified by the write request is relatively large whereas the actual amount of data written is relatively small.

With reference to FIG. 6B, this figure schematically shows a block diagram of another example of a performance feature 600B according to example implementations of the present disclosure. The performance feature further includes a payload in the data amount. In FIG. 6B, the elements denoted by reference numerals 610 to 630 have the same meaning as those in FIG. 6A, and the difference is that the performance feature 600B further includes a payload 640. Here, the payload 640 represents a data amount actually involved in the access request. For example, regarding a write request, the payload may be a data amount which actually needs to be written to the storage system. In order to determine the payload, a difference between the data amount accessed in the data extent and a target data object in the storage system may be determined, and the payload may be determined based on the difference. With example implementations of the present disclosure, it is possible to accurately measure the data amount involved in the data interaction in the storage system and further generate the association relationship 430 in a way that is more aligned with the actual operating conditions of the storage system.

According to example implementations of the present disclosure, the group of performance features associated with the group of data extents may be obtained based on historical performance of the storage system in a past time period. For example, a corresponding performance feature may be obtained with respect to each data extent in the group of data extents, for example, a group of performance features may be obtained as shown in Table 1 below. The $1^{st}$ column in Table 1 shows identifiers of data extents, the $2^{nd}$ to $5^{th}$ columns show various performance features shown in FIG. 6B, respectively.

TABLE 1

Example of Performance Feature

| Data Extent | Latency Time | Change | Data Stream | Payload |
|---|---|---|---|---|
| block_1 | | | | |
| block_2 | | | | |
| block_3 | | | | |
| ... | ... | ... | ... | ... |
| block_n | | | | |

Further, a group of operations which are currently being performed on the group of data extents may be determined, respectively. A garbage collection state of each data extent, i.e., whether the data extent is currently undergoing a garbage collection operation, may be determined based on an underlying function call to a storage device. Subsequently, the association relationship 430 may be trained using a machine learning method based on the performance features shown in Table 1 and the determined garbage collection state. Specifically, the association relationship may be trained based on the group of operations and the group of performance features associated with the group of data extents, so that a group of operation state estimates obtained based on the trained association relationship and the group of performance features match the group of operations. More details on how to train the association relation will be described with reference to FIG. 7 below.

Figure 7:
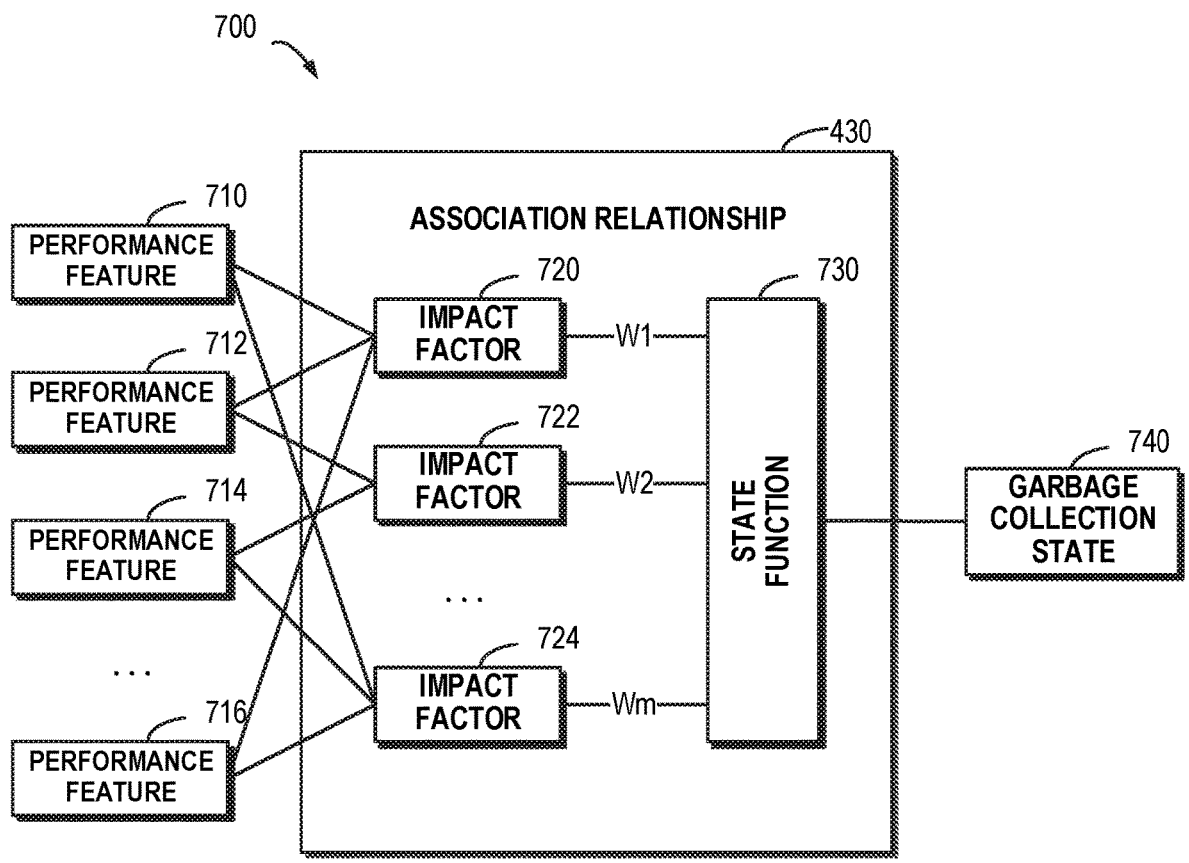
FIG. 7 schematically shows a block diagram of the process for building an association relationship between a performance feature and a garbage collection state according to example implementations of the present disclosure.

FIG. 7 schematically shows a block diagram 700 of a process for building the association relationship 430 between a performance feature and a garbage collection state according to example implementations of the present disclosure. As depicted, a plurality of impact factors 720, 722, . . . , and 724 may be set. Each impact factor may represent the impact of a corresponding attribute of the feature on one aspect of the association relationship 430, and a corresponding weight may be set to each impact factor. For example, a weight $W_1$ may be set to the impact factor 720, $W_2$ may be set to 722, . . . , and $W_m$ may be set to 724.

A state function 730 may be constructed based on machine learning technology. It is desired that the state function 730 represent the association relationship between a plurality of performance features 710, 712, 714, . . . , and 716 and corresponding garbage collection states 740. After the association relationship 430 has been trained based on historical data, if the performance features 710, 712, 714, . . . , and 716 are input to the association relationship 430, respectively, the garbage collection state 740 determined through the association relationship 430 tends to be consistent with a garbage collection state in the collected corresponding history in the storage system.

For example, suppose Formula 1 and Formula 2 represent an impact factor (wherein $x_i$ denotes the i impact factor) and a corresponding weight (wherein $w_i$ denotes a weight of the i impact factor), wherein the integer m (e.g., m=4 in the above Table 1) denotes the number of impact factors. At this point, the vector $X^T$ represents a group of impact factors, and the vector $W^T$ denotes corresponding weights.

$$X^T = [x_1\ x_2 \ldots x_m] \quad \text{Formula 1}$$

$$W^T = [w_1\ w_2 \ldots w_m] \quad \text{Formula 2}$$

The state function 730 may be represented using Formula 3 below, wherein z denotes the state function, and b denotes a constant.

$$Z = b + w_1 \times x_1 + w_2 \times x_2 + \ldots + w_m \times x_m \quad \text{Formula 3}$$
$$= b + \sum_{k=1}^{m} w_k \times x_k$$

A Sigmoid function may be used as an activation function of the association relationship 430. Further, a cost function may be built for representing the difference between a historical performance feature in collected historical data and a garbage collection state estimate determined based on the association relationship 430. With collected historical data, the association relationship 430 may be iteratively trained based on the above formulas, until the cost function satisfies a predetermined condition. It will be understood that illustrated above is merely a general principle for building the association relationship 430. In the context of the present disclosure, there is no limit to the way for training the association relationship 430, but the association relationship 430 may be obtained based on various training techniques that have been developed and/or will be developed in future.

According to example implementations of the present disclosure, the association relationship 430 may be continuously trained using a current group of performance features. Further, as time elapses, the association relationship 430 may be updated based on a newly collected performance feature and a corresponding garbage collection state. Where the association relationship 430 has been obtained, whether the garbage collection operation is currently performed on the address range specified by the access request may be determined, based on the association relationship 430 and a performance feature within the address range. Specifically, a performance feature associated with a data extent within the address range may be determined first. Here, the performance feature has the same dimension as a performance feature which is collected for generating the association relationship 430. According to the data structure shown in FIG. 6B, if the performance feature includes 4 attributes, then with respect to a data extent within the address range specified by the access request, the latency time, change, data amount and payload associated with the data extent may be obtained, respectively.

According to example implementations of the present disclosure, an operation state estimate associated with the determined performance feature may be obtained based on the performance feature and the association relationship 430. Specifically, by inputting the obtained performance feature to the association relationship 430, it may be determined whether a garbage collection operation is performed on a data extent within the address range. It will be understood that since the association relationship 430 is trained based on past historical performance features and historical garbage collection states, the association relationship 430 may accurately reflect the association between the performance features and the garbage collection states. Thereby, based on the association relationship 430, whether a given data extent is currently undergoing the garbage collection operation may be predicted according to the performance feature of the data extent.

It will be understood that since the garbage collection operation is a background operation inside a storage device in the storage system, previously, which data extent in which storage device in the storage system is currently undergoing the garbage collection operation cannot be determined at the storage system level. By means of example implementations of the present disclosure, it is possible to more conveniently and quickly estimate at the storage system level whether the data extent is currently undergoing the garbage collection operation, based on machine learning technology without calling the underlying function of the storage device.

Returning to FIG. 5, at block 530, an access type of the access request may be identified in accordance with determining that garbage collection operation is currently being performed on a data extent within the address range. It will be understood that various types of access requests may be executed on the storage system. For example, a read request may be executed, which may define that a data object is to be read from the specified address range in the storage system. In another example, a write request may be executed, which may define that a data object is to be written to the specified address range in the storage system. In still another example, a space allocation request may be executed, which may define that storage space in predetermined size is to be allocated from the storage system.

At block 540, the access request may be executed on the storage system based on the access type. More details will be described with respect to the read request, the write request and the space allocation request, respectively. As described with reference to FIGS. 1 to 3, example implementations of the present disclosure may be implemented in a Redundant Array of Independent Disks based storage system, at which point there exists redundant data in the storage system. If the read request desires to read data in a data extent on which the garbage collection operation is currently performed, then a group of extents comprising redundant data associated with data in the data extent may be found, and further data desired to be read in the data extent may be recovered based on data in the found group of extents.

Figure 8:
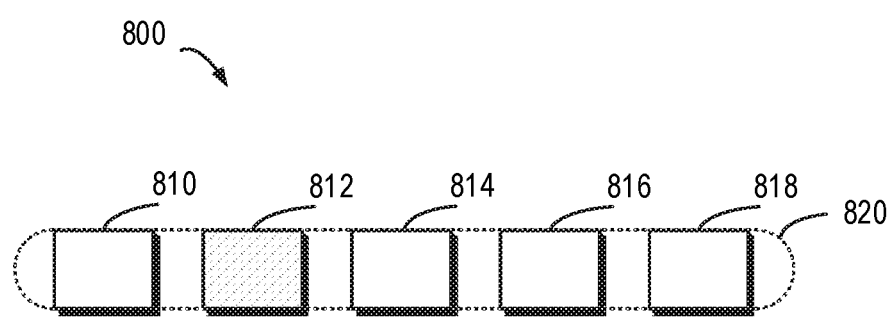
FIG. 8 schematically shows a block diagram of the process for executing an access request on a storage system according to the access type according to example implementations of the present disclosure.

In the context of the present disclosure, the storage system may be a Redundant Array of Independent Disks, and the storage system may include a plurality of stripes. With reference to FIG. 8, this figure schematically shows a block diagram 800 of a process for executing an access request on a storage system according to the access type according to example implementations of the present disclosure. FIG. 8 shows a stripe 820 in the storage system. Here, the storage system has a width of 5 (4D+1P), and the stripe 820 may include data extents 810, 812, 814, 816 and 818. Suppose the read request desires to read data in the data extent 812, and at this point an address range where the data extent 812 resides is undergoing a garbage collection operation. If data in the data extent 812 is read directly, then large time latency will result, and it will take a long time to return data to the requester.

According to example implementations of the present disclosure, the stripe 820, where the data extent 812 resides within the address range that is undergoing the garbage collection operation, may be determined. A group of data may be read from a group of data extents 810, 814, 816 and 818 other than the data extent 812 in the stripe 820. In the 4D+1P storage system, an XOR operation may be performed on data in the group of data extents 810, 814, 816 and 818 so as to rebuild data in the data extent 812.

According to example implementations of the present disclosure, it is unnecessary to read data from a storage device on which the garbage collection operation is performed. In this way, although reading and recovering data from a group of other data extents will cause overheads of time and computing resources, as compared with the time latency caused by the garbage collection operation, the overheads will not impose a heavy workload on the storage system but may greatly increase the response speed for the read request and improve the user experience.

According to example implementations of the present disclosure, when the access type is determined as a write type, if data is directly written to the data extent on which the garbage collection operation is performed, then large time latency will result. Therefore, a temporary data extent that is not undergoing the garbage collection operation may be selected from the storage system, and then the data object is written to the selected temporary data extent. It will be understood that according to example implementations of the present disclosure, a location and type of the temporary data extent are not limited, but the temporary data extent may be an ordinary data extent in the storage system. Alternatively and/or additionally, the temporary data extent may further be a data extent in a dedicated high-speed memory with higher data access speed in the storage system.

It will be understood that in the RAID storage system, a plurality of data extents in one stripe must reside on different storage devices. Therefore, when selecting the temporary data extent, it should be ensured that a storage device where the temporary data extent data resides is different from storage devices where other data extents in the stripe reside.

According to example implementations of the present disclosure, a stripe where the data extent resides within the address range may be determined first. Returning to FIG. 8, suppose the write request desires to write data to the data extent 812, whereas the data extent 812 is currently undergoing the garbage collection operation. At this point, a group of other data extents 810, 814, 816 and 818 in the stripe 820 where the data extent 812 may be determined. A storage device other than storage devices where the data extents 810, 814, 816 and 818 reside may be selected from the storage system as a temporary storage device, and a free data extent may be selected from the temporary storage device as a temporary data extent. After data has been written to the temporary data extent, an address mapping corresponding to the data object may be updated. Specifically, an address of the data object may be set as an address range in the temporary data extent to which the data object is written.

With example implementations of the present disclosure, data is not needed to be written to the storage device on which the garbage collection operation is performed, but the to-be-written data is written to a temporary storage area with a higher access speed. In this way, although the temporary storage area will occupy storage space in the storage system, overheads of the above storage space will not impose a heavy workload on the storage system. In fact, as compared with the time latency caused by the garbage collection operation, the above implementation may greatly increase the response speed for the write request and improve the user experience.

Description has been presented to the case in which the data extent specified by the write request is currently undergoing the garbage collection operation, at which point the data object is written to the temporary data extent. After the garbage collection operation is completed, the data object needs to be further migrated from the temporary data extent to the address range specified by the write request. Subsequently the address mapping may be updated so as to set the address of the data object as the address range specified by the write request. At this point, the data object is written to the data extent 812 specified by the write request, and the address mapping of the data object also points to the address range specified by the write request. After performing the migration operation, the storage space taken by the temporary data extent may be released.

According to example implementations of the present disclosure, if the access type is determined as a space allocation type, then a group of storage devices that are not undergoing garbage collection may be selected from the plurality of storage devices in the storage system, so as to serve the space allocation request. It will be understood that the space allocation request is usually followed by a write request. By allocating storage space in the group of storage devices that are not undergoing garbage collection to the requester, the latency caused by garbage collection to the subsequent write request may be avoided and furthermore the operation efficiency of the storage system may be improved.

According to example implementations of the present disclosure, the number of storage devices to be selected may be determined according to the width of the storage system, and then a group of storage devices, satisfying the number, that are not undergoing garbage collection may be selected from a plurality of storage devices. Furthermore, a group of free data extents may be selected from the group of storage devices, respectively, so that the selected group of data extents may be allocated to a requester of the space allocation request.

According to example implementations of the present disclosure, on the one hand, whether the storage system is undergoing a garbage collection operation or not may be estimated based on the association relationship 430. In this way, the underlying function of the storage device does not need to be called, but the garbage collection state of the storage device may be determined effectively at the storage system level. On the other hand, if the address range involved in the access request is currently undergoing garbage collection, then using a storage device that is undergoing garbage collection operation may be avoided, but a storage device that is not undergoing garbage collection may be selected for serving the access request. In this way, the operation efficiency of the storage system may be improved, and the response speed thereof may be increased.

While examples of the method according to the present disclosure have been described in detail with reference to FIGS. 2 to 8, description is presented below to the implementation of a corresponding apparatus. According to example implementations of the present disclosure, an apparatus is provided for managing an access request in a storage system. The apparatus includes: an obtaining module configured to obtain, based on an access request to the storage system, an address range of a data object involved in the access request; a determining module configured to determine whether a garbage collection operation is performed on a data extent within the address range or not, based on an association relationship between a group of address ranges and a group of operations being performed on a group of data extents within the group of address ranges; an identifying module configured to identify an access type of the access request in accordance with determining that the garbage collection operation is performed on the data extent within the address range; and a responding module configured to respond to the access request based on the access type by using a data extent within an address range in the storage system on which no garbage collection operation is performed.

According to example implementations of the present disclosure, the storage system is a Redundant Array of Independent Disks, the storage system comprising a plurality of stripes; and the responding module includes a reading module. The reading module includes: a stripe determining module configured to determine, in accordance with determining that the access type is a read type, a stripe where the data extent resides within the address range; a data reading module configured to read a group of data from a group of data extents other than the data extent in the stripe; and a rebuilding module configured to rebuild the data object based on the read group of data.

According to example implementations of the present disclosure, the storage system is a Redundant Array of Independent Disks, the storage system comprising a plurality of stripes; and the responding module includes a writing module. The writing module includes: a selecting module configured to select, in accordance with determining that the access type is a write type, from the storage system a temporary data extent on which no garbage collection operation is performed; a data writing module configured to write the data object to the selected temporary data extent; and an updating module configured to update an address mapping corresponding to the data object, so as to set an address of the data object as an address range to which the data object is written.

According to example implementations of the present disclosure, the selecting module is configured to: determine a stripe where the data extent resides within the address range; determine a group of data extents other than the data extent in the stripe; and select the temporary data extent from a storage device other than a group of storage devices where the group of data extents reside in the storage system.

According to example implementations of the present disclosure, the apparatus further includes: a migrating module configured to migrate the data object from the temporary data extent to the address range in accordance with determining that the garbage collection operation has been completed; and a mapping updating module configured to update the address mapping so as to set the address of the data object as the address range.

According to example implementations of the present disclosure, the storage system is a Redundant Array of Independent Disks, the storage system comprising a plurality of stripes; and the responding module includes an allocating module. The allocating module includes: an extent selecting module configured to select, in accordance with determining that the access type is a space allocation type, from the storage system a group of data extents on which no garbage collection operation is performed; and an extent allocating module configured to allocate the selected group of data extents to a requester of the access request.

According to example implementations of the present disclosure, the apparatus further includes: a sample obtaining module configured to obtain a group of performance features associated with the group of data extents and the group of operations being performed on the group of data extents; and a training module configured to train the association relationship based on the group of operations and the group of performance features associated with the group of data extents, so that a group of operation state estimates obtained based on the trained association relationship and the group of performance features match the group of operations.

According to example implementations of the present disclosure, a performance feature in the group of performance features includes at least one of: latency time in accessing a data extent in the group of data extents, a change of the latency time within a predetermined time period, and a data amount accessed in the data extent.

According to example implementations of the present disclosure, a performance feature in the group of performance features further includes a payload in the data amount, and the apparatus further includes: a difference determining module configured to determine a difference between the data amount accessed in the data extent and a target data object in the storage system; and a payload determining module configured to determine the payload based on the difference.

According to example implementations of the present disclosure, the determining module includes: a feature determining module configured to determine a performance feature associated with the data extent within the address range; and an estimating module configured to obtain the operation state estimate associated with the determined performance feature based on the performance feature and the association relationship.

Figure 9:
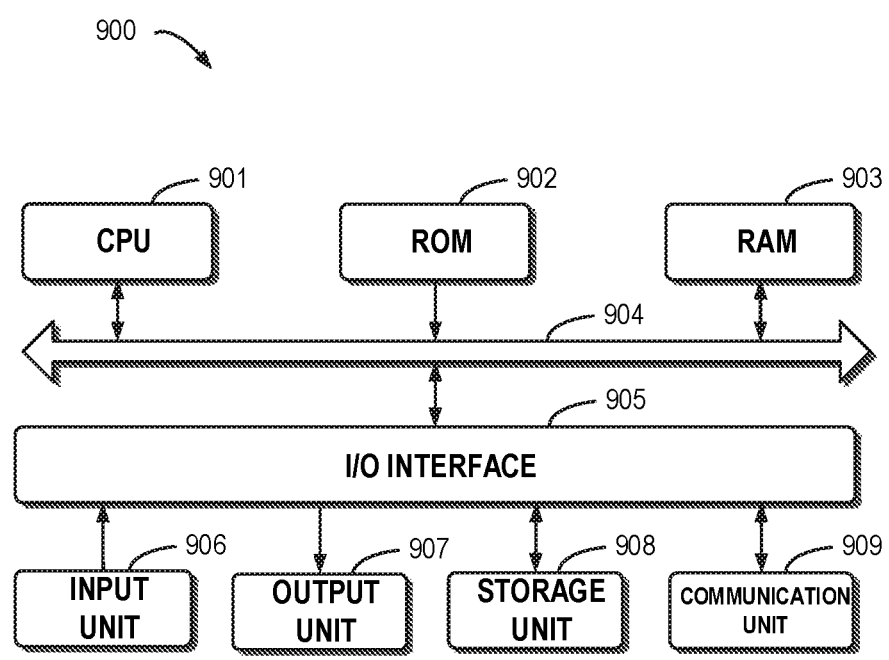
FIG. 9 schematically shows a block diagram of a device for managing an access request in a storage system according to example implementations of the present disclosure.

FIG. 9 schematically shows a block diagram of a device 900 for managing a storage system according to example implementations of the present disclosure. As depicted, the device 900 includes a central processing unit (CPU) 901, which can execute various suitable actions and processing based on the computer program instructions stored in the read-only memory (ROM) 902 or computer program instructions loaded in the random-access memory (RAM) 903 from a storage unit 908. The RAM 903 can also store all kinds of programs and data required by the operations of the device 900. CPU 901, ROM 902 and RAM 903 are connected to each other via a bus 904. The input/output (I/O) interface 905 is also connected to the bus 904.

A plurality of components in the device 900 are connected to the I/O interface 905, including: an input unit 906, such as a keyboard, mouse and the like; an output unit 907, e.g., various kinds of displays and loudspeakers etc.; a storage unit 908, such as a magnetic disk and optical disk, etc.; and a communication unit 909, such as a network card, modem, wireless transceiver and the like. The communication unit 909 allows the device 900 to exchange information/data with other devices via the computer network, such as Internet, and/or various telecommunication networks.

The above described process and treatment, such as the method 500 can also be executed by the processing unit 901. For example, in some implementations, the method 500 can be implemented as a computer software program tangibly included in the machine-readable medium, e.g., the storage unit 908. In some implementations, the computer program can be partially or fully loaded and/or mounted to the device 900 via ROM 902 and/or the communication unit 909. When the computer program is loaded to the RAM 903 and executed by the CPU 901, one or more steps of the above described method 500 can be implemented. Alternatively, in other implementations, the CPU 901 also can be configured in other suitable ways to realize the above procedure/method.

According to example implementations of the present disclosure, an electronic device is provided, and the electronic device includes: at least one processor; and a memory coupled to the at least one processor, the memory having instructions stored thereon, the instructions, when executed by the at least one processor, causing the device to perform acts. The acts include: obtaining, based on an access request to the storage system, an address range of a data object involved in the access request; determining whether a garbage collection operation is performed on a data extent within the address range or not, based on an association relationship between a group of address ranges and a group of operations being performed on a group of data extents within the group of address ranges; identifying an access type of the access request in accordance with determining that the garbage collection operation is performed on the data extent within the address range; and responding to the access request based on the access type by using a data extent within an address range in the storage system on which no garbage collection operation is performed.

According to example implementations of the present disclosure, the storage system is a Redundant Array of Independent Disks, the storage system comprising a plurality of stripes; and responding to the access request based on the access type by using the data extent within the address range in the storage system on which no garbage collection operation is performed includes: in accordance with determining that the access type is a read type, determining a stripe where the data extent resides within the address range; reading a group of data from a group of data extents other than the data extent in the stripe; and rebuilding the data object based on the read group of data.

According to example implementations of the present disclosure, the storage system is a Redundant Array of Independent Disks, the storage system comprising a plurality of stripes; and responding to the access request based on the access type by using the data extent within the address range in the storage system on which no garbage collection operation is performed includes: in accordance with determining that the access type is a write type, selecting from the storage system a temporary data extent on which no garbage collection operation is performed; writing the data object to the selected temporary data extent; and updating an address mapping corresponding to the data object, so as to set an address of the data object as an address range to which the data object is written.

According to example implementations of the present disclosure, selecting from the storage system the temporary data extent on which no garbage collection operation is performed includes: determining a stripe where the data extent resides within the address range; determining a group of data extents other than the data extent in the stripe; and selecting the temporary data extent from a storage device other than a group of storage devices where the group of data extents reside in the storage system.

According to example implementations of the present disclosure, the acts further include: migrating the data object from the temporary data extent to the address range in accordance with determining that the garbage collection operation has been completed; and updating the address mapping so as to set the address of the data object as the address range.

According to example implementations of the present disclosure, the storage system is a Redundant Array of Independent Disks, the storage system comprising a plurality of stripes; and executing the access request on the storage system according to the access type includes: in accordance with determining that the access type is a space allocation type, selecting from the storage system a group of data extents on which no garbage collection operation is performed; and allocating the selected group of data extents to a requester of the access request.

According to example implementations of the present disclosure, the acts further include: obtaining a group of performance features associated with the group of data extents and a group of operations being performed on the group of data extents; and training the association relationship based on the group of operations and the group of performance features associated with the group of data extents, so that a group of operation state estimates obtained based on the trained association relationship and the group of performance features match the group of operations.

According to example implementations of the present disclosure, a performance feature in the group of performance features includes at least one of: latency time in accessing a data extent in the group of data extents, a change of the latency time within a predetermined time period, and a data amount accessed in the data extent.

According to example implementations of the present disclosure, the performance feature in the group of performance features further includes a payload in the data amount, and the acts further include: determining a difference between the data amount accessed in the data extent and a target data object in the storage system; and determining the payload based on the difference.

According to example implementations of the present disclosure, determining whether a garbage collection operation is performed on the data extent within the address range includes: determining a performance feature associated with the data extent within the address range; and obtaining the operation state estimate associated with the determined performance feature based on the performance feature and the association relationship.

According to example implementations of the present disclosure, a computer program product is provided. The computer program product is tangibly stored on a non-transitory computer-readable medium and includes machine-executable instructions which are used to implement the method according to the present disclosure.

According to example implementations of the present disclosure, a computer-readable medium is provided. The computer-readable medium has machine-executable instructions stored thereon, the machine-executable instructions, when executed by at least one processor, causing the at least one processor to implement the method according to the present disclosure.

The present disclosure can be a method, device, system and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but is not limited to, an electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transitory signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combinations of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where a remote computer is involved, the remote computer can be connected to the user computer via any type of network, including local area network (LAN) and wide area network (WAN), or to the external computer (e.g., connected via Internet using an Internet service provider). In some implementations, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow charts and/or block diagrams of method, apparatus (system) and computer program products according to implementations of the present disclosure. It should be understood that each block of the flow charts and/or block diagrams and the combination of various blocks in the flow charts and/or block diagrams can be implemented by computer-readable program instructions.

The computer-readable program instructions can be provided to the processing unit of a general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular way, such that the computer-readable medium stored with instructions contains an article of manufacture, including instructions for implementing various aspects of the functions/actions stipulated in one or more blocks of the flow chart and/or block diagram.

The computer-readable program instructions can also be loaded into a computer, other programmable data processing apparatuses or other devices, so as to execute a series of operation steps on the computer, the other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow charts and block diagrams in the drawings illustrate system architecture, functions and operations that may be implemented by system, method and computer program products according to a plurality of implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order depending on the functions involved. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various implementations of the present disclosure have been described above and the above description is only exemplary rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each implementation and technical improvements made in the market by each implementation, or enable others of ordinary skill in the art to understand implementations of the present disclosure.

I claim:

1. A method for managing an access request in a storage system, the method comprising:
    obtaining, based on an access request to the storage system, an address range of a data object involved in the access request;
    determining whether a garbage collection operation is performed on any data extent within the address range, based on an association relationship between a group of address ranges and a group of operations being performed on a group of data extents within the group of address ranges;
    identifying an access type of the access request in accordance with determining that the garbage collection operation is performed on the data extent within the address range;
    responding to the access request based on the access type by using a data extent within an address range in the storage system on which no garbage collection operation is performed;
    obtaining a group of performance features associated with the group of data extents and the group of operations being performed on the group of data extents; and
    training the association relationship based on the group of operations and the group of performance features associated with the group of data extents, so that a group of operation state estimates obtained based on the trained association relationship and the group of performance features match the group of operations, wherein the performance feature in the group of performance features comprises a payload in the data amount, wherein determining the payload comprises:
   determining a difference between the data amount accessed in the data extent and a target data object in the storage system, and
   determining the payload based on the difference.

2. The method of claim 1,
wherein the storage system is a Redundant Array of Independent Disks,
wherein the storage system comprising a plurality of stripes; and
wherein responding to the access request based on the access type by using the data extent within the address range in the storage system on which no garbage collection operation is performed comprises:
   in accordance with determining that the access type is a read type,
      determining a stripe where the data extent resides within the address range;
      reading a group of data from a group of data extents other than the data extent in the stripe; and
      rebuilding the data object based on the read group of data.

3. The method of claim 1,
wherein the storage system is a Redundant Array of Independent Disks,
wherein the storage system comprising a plurality of stripes; and
wherein responding to the access request based on the access type by using the data extent within the address range in the storage system on which no garbage collection operation is performed comprises:
   in accordance with determining that the access type is a write type,
      selecting from the storage system a temporary data extent on which no garbage collection operation is performed;
      writing the data object to the selected temporary data extent; and
      updating an address mapping corresponding to the data object, so as to set an address of the data object as a second address range to which the data object is written.

4. The method of claim 3, wherein selecting from the storage system the temporary data extent on which no garbage collection operation is performed comprises:
   determining a stripe where the data extent resides;
   determining a group of data extents other than the data extent in the stripe; and
   selecting the temporary data extent from a storage device other than a group of storage devices where the group of data extents reside in the storage system.

5. The method of claim 3, further comprising:
   migrating the data object from the temporary data extent to the address range in accordance with determining that the garbage collection operation has been completed; and
   updating the address mapping so as to set the address of the data object as the address range.

6. The method of claim 1,
wherein the storage system is a Redundant Array of Independent Disks,
wherein the storage system comprising a plurality of stripes; and
wherein responding to the access request based on the access type by using the data extent within the address range in the storage system on which no garbage collection operation is performed comprises:
   in accordance with determining that the access type is a space allocation type,
      selecting from the storage system a group of data extents on which no garbage collection operation is performed; and
      allocating the selected group of data extents to a requester of the access request.

7. The method of claim 1, wherein a performance feature in the group of performance features further comprises at least one of:
   latency time in accessing a data extent in the group of data extents, a change of the latency time within a predetermined time period, and a data amount accessed in the data extent.

8. The method of claim 1, wherein determining whether the garbage collection operation is performed on the data extent within the address range comprises:
   determining a performance feature associated with the data extent within the address range; and
   obtaining the operation state estimate associated with the determined performance feature based on the performance feature and the association relationship.

9. An electronic device, comprising:
   at least one processor; and
   a memory coupled to the at least one processor, the memory having instructions stored thereon, the instructions, when executed by the at least one processor, causing the electronic device to perform a method for managing an access request in a storage system, the method comprising:
   obtaining, based on an access request to the storage system, an address range of a data object involved in the access request;
   determining whether a garbage collection operation is performed on a data extent within the address range, based on an association relationship between a group of address ranges and a group of operations being performed on a group of data extents within the group of address ranges;
   identifying an access type of the access request in accordance with determining that the garbage collection operation is performed on the data extent within the address range;
   responding to the access request based on the access type by using a data extent within an address range in the storage system on which no garbage collection operation is performed;
   obtaining a group of performance features associated with the group of data extents and the group of operations being performed on the group of data extents; and
   training the association relationship based on the group of operations and the group of performance features associated with the group of data extents, so that a group of operation state estimates obtained based on the trained association relationship and the group of performance features match the group of operations,
   wherein the performance feature in the group of performance features comprises a payload in the data amount, wherein determining the payload comprises:
  determining a difference between the data amount accessed in the data extent and a target data object in the storage system, and
  determining the payload based on the difference.

10. The electronic device of claim 9,
wherein the storage system is a Redundant Array of Independent Disks,
wherein the storage system comprising a plurality of stripes; and
wherein responding to the access request based on the access type by using the data extent within the address range in the storage system on which no garbage collection operation is performed comprises:
  in accordance with determining that the access type is a read type,
    determining a stripe where the data extent resides within the address range;
    reading a group of data from a group of data extents other than the data extent in the stripe; and
    rebuilding the data object based on the read group of data.

11. The electronic device of claim 9,
wherein the storage system is a Redundant Array of Independent Disks,
wherein the storage system comprising a plurality of stripes; and
wherein responding to the access request based on the access type by using the data extent within the address range in the storage system on which no garbage collection operation is performed comprises:
  in accordance with determining that the access type is a write type,
    selecting from the storage system a temporary data extent on which no garbage collection operation is performed;
    writing the data object to the selected temporary data extent; and
    updating an address mapping corresponding to the data object, so as to set an address of the data object as a second address range to which the data object is written.

12. The electronic device of claim 11, wherein selecting from the storage system the temporary data extent on which no garbage collection operation is performed comprises:
  determining a stripe where the data extent resides;
  determining a group of data extents other than the data extent in the stripe; and
  selecting the temporary data extent from a storage device other than a group of storage devices where the group of data extents reside in the storage system.

13. The electronic device of claim 11, the method further comprising:
  migrating the data object from the temporary data extent to the address range in accordance with determining that the garbage collection operation has been completed; and
  updating the address mapping so as to set the address of the data object as the address range.

14. The electronic device of claim 9,
wherein the storage system is a Redundant Array of Independent Disks,
wherein the storage system comprising a plurality of stripes; and
wherein responding to the access request based on the access type by using the data extent within the address range in the storage system on which no garbage collection operation is performed comprises:
  in accordance with determining that the access type is a space allocation type,
    selecting from the storage system a group of data extents on which no garbage collection operation is performed; and
    allocating the selected group of data extents to a requester of the access request.

15. The electronic device of claim 9, wherein a performance feature in the group of performance features further comprises at least one of:
  latency time in accessing a data extent in the group of data extents, a change of the latency time within a predetermined time period, and a data amount accessed in the data extent.

16. A computer program product, tangibly stored on a non-transitory computer-readable medium and comprising machine-executable instructions, which are used to perform a method, the method comprising:
  obtaining, based on an access request to the storage system, an address range of a data object involved in the access request;
  determining whether a garbage collection operation is performed on any data extent within the address range, based on an association relationship between a group of address ranges and a group of operations being performed on a group of data extents within the group of address ranges;
  identifying an access type of the access request in accordance with determining that the garbage collection operation is performed on the data extent within the address range;
  responding to the access request based on the access type by using a data extent within an address range in the storage system on which no garbage collection operation is performed;
  obtaining a group of performance features associated with the group of data extents and the group of operations being performed on the group of data extents; and
  training the association relationship based on the group of operations and the group of performance features associated with the group of data extents, so that a group of operation state estimates obtained based on the trained association relationship and the group of performance features match the group of operations,
wherein the performance feature in the group of performance features comprises a payload in the data amount,
wherein determining the payload comprises:
  determining a difference between the data amount accessed in the data extent and a target data object in the storage system, and
  determining the payload based on the difference.

* * * * *